United States Patent [19]

Theakston

[11] Patent Number: 5,032,047
[45] Date of Patent: Jul. 16, 1991

[54] BARREL NUT RETENTION APPARATUS

[75] Inventor: Harry A. Theakston, Rancho Santa Margarita, Calif.

[73] Assignee: SPS Technologies, Inc., Newtown, Pa.

[21] Appl. No.: 551,984

[22] Filed: Jul. 12, 1990

[51] Int. Cl.$^5$ .................... F16B 27/00; F16B 37/00
[52] U.S. Cl. .................... 411/104; 411/85; 411/432; 411/970
[58] Field of Search .............. 411/84, 85, 104, 112, 411/432, 970

[56] References Cited

U.S. PATENT DOCUMENTS

| 2,903,035 | 9/1959 | Davenport et al. | 411/104 |
| 3,192,982 | 7/1965 | Rohe et al. | 411/104 |
| 4,861,207 | 8/1989 | Do | 411/104 |

FOREIGN PATENT DOCUMENTS 1061149  3/1967  United Kingdom ........... 411/85

Primary Examiner—Neill R. Wilson
Attorney, Agent, or Firm—James D. Dee; Aaron Nerenberg

[57] ABSTRACT

A barrel nut retention apparatus for retaining a barrel nut within a cylindrical bore in a panel comprising a barrel nut and retaining means. The barrel nut is comprised of a threaded bore having a longitudinal axis, and a partially cylindrical base portion having opposed first and second shoulders on the outer extremity thereof. The opposed shoulders project away from the threaded bore. Furthermore, the retaining means is comprised of a resilient member having a first portion and a second portion being positioned on opposite sides of the threaded bore and being seated on the opposed shoulders in a plane generally perpendicular to the longitudinal axis. A part of the first portion and a part of the second portion are adapted to engage the panel when the apparatus is installed within the cylindrical bore. Additionally, the resilient member has a third portion disposed between the first and second portions and integrally connecting the first and second portions. This third portion is also engaged with the first shoulder in a plane generally parallel to the longitudinal axis. The retaining means is further comprised of a supporting member connecting the first and second portions of the resilient member. The supporting member is engaged with the second shoulder in a plane generally parallel to the longitudinal axis.

4 Claims, 2 Drawing Sheets

BARREL NUT RETENTION APPARATUS

BACKGROUND OF INVENTION

1. Field of the Invention

This invention generally relates to barrel nuts and, more particularly, to barrel nut retention apparatus located within a cylindrical bore in a panel.

2. Description of the Prior Art

Fastener apparatus utilizing barrel nuts are well-known in the prior art and are useful in fastening together panels. Such prior art apparatus usually include a barrel nut having a threaded bore for receiving a conventional bolt and some type of retainer for loosely supporting the nut in a cylindrical bore formed in one of the panels. The retainer is generally sized to enable the alignment of the nut's threaded bore with a transverse hole formed in the panel so that the bolt can thereafter be inserted through the aligned holes to threadedly engage the nut. U.S. Pat. No. 4,861,207, Do, discloses a recent example of a barrel nut fastener apparatus that includes a nut loosely retained in a prescribed position by a retainer that is adapted to be slidably received in a cylindrical bore formed in a panel. The nut is carried loosely on a seat formed in the retainer and is positioned to threadedly receive a bolt projecting through aligned transverse holes in both the panel and the retainer. The nut and seat have conforming cross-shaped configurations such that the compressive force of their engagement is distributed over a relatively large area, thereby substantially reducing the possibility of the nut being deformed if the bolt is overtightened.

However, many of the prior art barrel nut fastener apparatus are bulky, with many parts. Also, many of the prior art apparatus require special tools to install the barrel nut and retainer in the panel. Therefore, a barrel nut retention apparatus that is lightweight, simply constructed, and which can be installed without special tooling, is desirable.

Accordingly, it is a general object of the present invention to provide a barrel nut retention apparatus which overcomes the disadvantages of the prior art. It is a further object of the present invention to provide a barrel nut retention apparatus which is lightweight. A still further object of the present invention is to provide a barrel nut retention apparatus that is simple in construction and is capable of installation without the need for special tooling.

SUMMARY OF THE INVENTION

These and other objects of the present invention are achieved by providing an apparatus for retaining a barrel nut within a cylindrical bore in a panel comprising a barrel nut and retaining means. The barrel nut is comprised of a threaded bore having a longitudinal axis, and a partially cylindrical base portion having opposed first and second shoulders on the outer extremity thereof. The opposed shoulders project away from the threaded bore. Furthermore, the retaining means is comprised of a resilient member having a first portion and a second portion being positioned on opposite sides of the threaded bore and being seated on the opposed shoulders in a plane generally perpendicular to the longitudinal axis. A part of the first portion and a part of the second portion are adapted to engage the panel when the apparatus is installed within the cylindrical bore. Additionally, the resilient member has a third portion disposed between the first and second portions and integrally connecting the first and second portions. This third portion is also engaged with the first shoulder in a plane generally parallel to the longitudinal axis. The retaining means is further comprised of a supporting member connecting the first and second portions of the resilient member. The supporting member is engaged with the second shoulder in a plane generally parallel to the longitudinal axis.

In one preferred embodiment, the first portion and the second portion of the resilient member are both curved and convex in relation to the longitudinal axis. In another preferred embodiment, the first portion and the second portion of the resilient member are each comprised of two straight segments joined together so that the juncture of the segments engages the panel when the apparatus is installed within the cylindrical bore.

The barrel nut retention apparatus in accordance with this invention provides a lightweight, simply constructed, frictional type barrel nut retaining apparatus that allows positioning of the barrel nut in the cylindrical bore of the panel without the use of a special tool. This invention also allows the bolt threads to protrude through the top of the barrel nut without any interference with the retention means when a bolt extends through a bolt hole in the panel and is threadedly engaged with the threaded bore of the barrel nut.

BRIEF DESCRIPTION OF THE DRAWINGS

In the drawings, where like reference numerals refer to like elements throughout.

DESCRIPTION OF THE PREFERRED EMBODIMENTS

Figure 1:
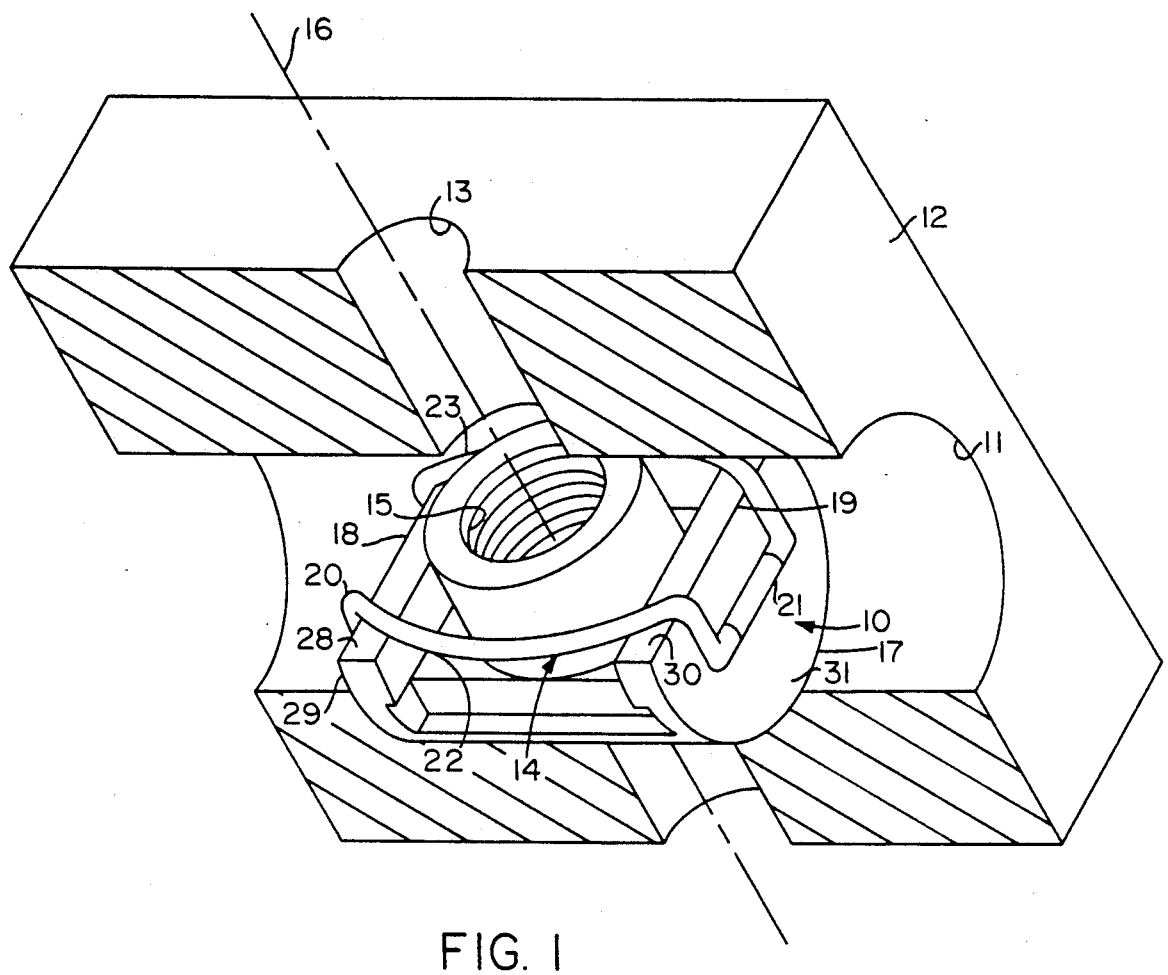
FIG. 1 is a perspective view of a barrel nut retention apparatus in accordance with the present invention, the apparatus being depicted as installed in a panel illustrated in cross section.
Figure 2:
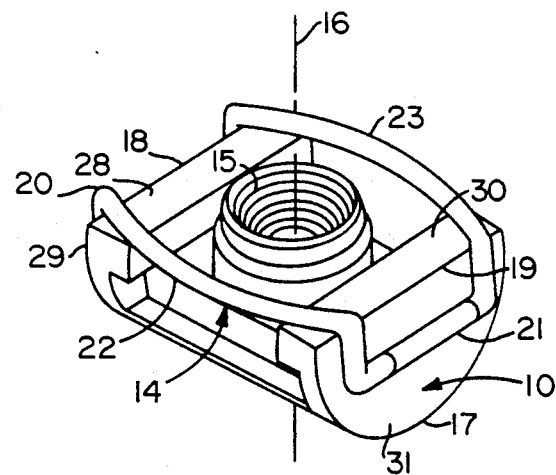
FIG. 2 is a perspective view of one preferred embodiment of the barrel nut retention apparatus shown in FIG. 1.

Referring now to the drawings, particularly FIGS. 1 and 2, a barrel nut retention apparatus is illustrated in accordance with this invention. The apparatus provides for retention of barrel nut 10 within a cylindrical bore 11 in a panel 12 so that the barrel nut 10 is capable of threadedly receiving a bolt (not shown) extending through a bolt hole 13 in the panel 12. The bolt hole 13 is oriented transversely to the cylindrical bore 11.

The apparatus of the present invention includes the barrel nut 10 and a retaining clip 14. The barrel nut 10 is of the conventional type known in the art, and is comprised of a threaded bore 15 having a longitudinal axis 16. The barrel nut 10 is further comprised of a partially cylindrical base portion 17 sized to fit into the cylindrical bore 11 in the panel 12. As illustrated in FIGS. 1 and 2, the partially cylindrical base portion 17 is generally cradle shaped. The base portion 17 further has a first shoulder 18 and a second shoulder 19 on the outer extremity of the base portion 17. The first shoulder 18 and the second shoulder 19 are positioned on opposite sides of the threaded bore 15, and both of the shoulders project away from the threaded bore 15.

The retaining clip 14 is adapted to be positioned within the cylindrical bore 11 in the panel 12. The retaining clip 14 is comprised of a resilient member 20 and a supporting member 21. Preferably, the retaining clip 14 is cylindrical in shape, as illustrated in the drawings. Also, the retaining clip 14 is generally cup-shaped when viewed from the side. The resilient member 20 has a first portion 22 and a second portion 23. The first portion 22 and the second portion 23 are positioned on opposite sides of the threaded bore 15, and these portions are seated on the opposed shoulders of the barrel nut 10 in a plane generally perpendicular to the longitudinal axis 16. A part of the first portion 22 and a part of the second portion 23 are adapted to frictionally engage the panel 12 when the apparatus is installed within the cylindrical bore 11. The resilient member 20 also has a third portion 24, which is readily observable in FIG. 3 and FIG. 6. The third portion 24 is disposed between the first portion 22 and the second portion 23. The third portion 24 also integrally connects the first portion 22 and the second portion 23 of the resilient member 20. Furthermore, the third portion 24 is frictionally engaged with the first shoulder 18 of the barrel nut 10 in a plane generally parallel to the longitudinal axis 16.

Figure 3:
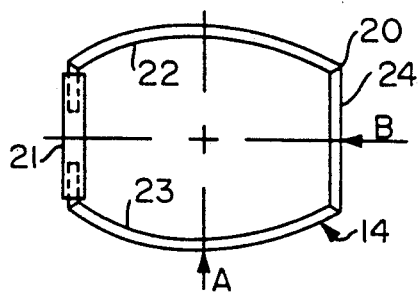
FIG. 3 is a top plan view of the retaining clip of the preferred embodiment of the barrel nut retention apparatus of FIG. 2.
Figure 4:
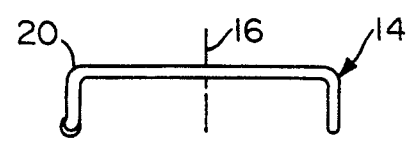
FIG. 4 is a side plan view of the retaining clip, taken substantially in the direction of the arrow A in FIG. 3.
Figure 5:
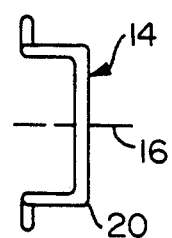
FIG. 5 is another side plan view of the retaining clip, taken substantially in the direction of the arrow B in FIG. 3.
Figure 6:
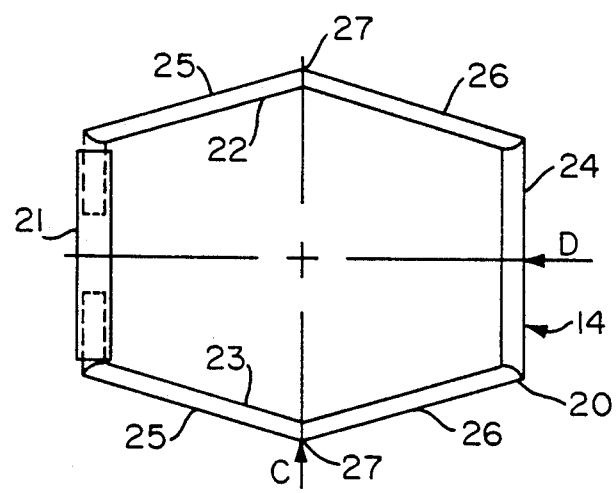
FIG. 6 is a top plan view of the retaining clip of another preferred embodiment of the barrel nut retention apparatus in accordance with the present invention.

The supporting member 21 of the retaining clip 14 connects the first portion 22 and the second portion 23, and the supporting member 21 is further frictionally engaged with the second shoulder 19 of the barrel nut 10 in a plane generally parallel to the longitudinal axis 16. Advantageously, the first portion 22 and the second portion 23 both have cylindrical ends adjacent to the second shoulder 19 in a plane generally parallel to the longitudinal axis 16, and the supporting member 21 is a hollow cylindrical tube having the ends of the first and second portions inserted in opposite extremities thereof as illustrated in FIG. 3 and FIG. 6.

With reference to FIGS. 1 and 2, the first shoulder 18 of the base portion 17 has a first face 28 in the plane generally perpendicular to the longitudinal axis 16 on which a part of the first portion 22 and a part of the second portion 23 of the resilient member 20 are seated. Additionally, the first shoulder 18 has a second face 29 in the plane generally parallel to the longitudinal axis 16 on which the third portion 24 of the resilient member 20 is frictionally engaged. The first face 28 is perpendicular to the second face 29 of the first shoulder 18, and the resilient member 20 bends around the perpendicular intersection of the first face 28 and the second face 29. Thereafter, the resilient member 20 bends again along the second face 29 to provide the third portion noted above. Also, the second shoulder 19 of the base portion 17 has a first face 30 in the plane generally perpendicular to the longitudinal axis 16 on which a part of the first portion 22 and a part of the second portion 23 of the resilient member 20 are seated. Additionally, the second shoulder 19 has a second face 31 in the plane generally parallel to the longitudinal axis 16 on which the supporting member 21 is frictionally engaged. The first face 30 is perpendicular to the second face 31 of the second shoulder 19, and the resilient member 20 bends around the perpendicular intersection of the first face 30 and the second face 31. The resilient member 20 then bends again along the second face 31 to provide two ends which are connected with the supporting member 21.

Figure 7:
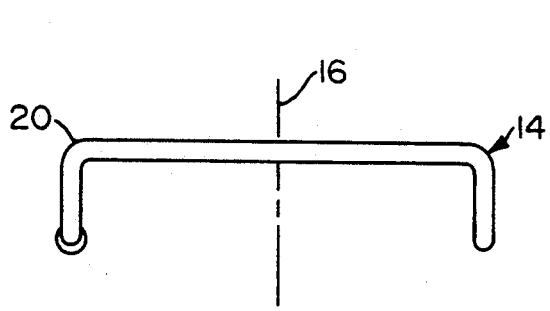
FIG. 7 side plan view of the retaining clip, taken substantially in the of the arrow C in FIG. 6.
Figure 8:
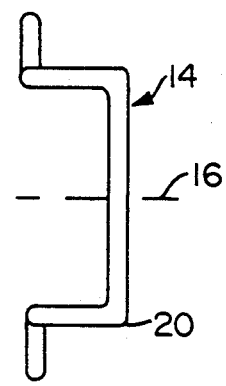
FIG. 8 is another side plan view of the retaining clip, taken substantially in the direction of the arrow D in FIG. 6.

One preferred embodiment of the present invention is illustrated in FIGS. 1 through 5. In this embodiment, the first portion 22 and the second portion 23 of the resilient member 20 of the retaining clip 14 are both curved and convex in relation to the longitudinal axis 16. Another embodiment of the present invention is illustrated in FIGS. 6 through 8 wherein the first portion 22 and the second portion 23 of the resilient member 20 of the retaining clip 14 are each comprised of a first straight segment 25 and a second straight segment 26, which are joined together so that the juncture 27 of the segments engages the panel 12 when the apparatus is installed within the cylindrical bore 11.

The barrel nut retention clip in accordance with the present invention provides a lightweight, frictional type retaining device that allows positioning of a conventional barrel nut within the cylindrical bore in the panel, without the use of a special tool. Furthermore, this retaining clip allows the bolt threads to protrude through the top of the barrel nut without any interference with the retaining clip when a bolt extends through the bolt hole in the panel and is threadedly engaged with the threaded bore of the barrel nut. Moreover, both ends of the retaining clip are bent in such a way as to retain and position the clip for ready installation in the cylindrical bore. Also, both sides of the retaining clip are formed to provide frictional retention of the barrel nut in the cylindrical bore, thereby allowing ease of installation and removal of the barrel nut without the need of special tooling. Additionally, the supporting member of the retaining clip, which is installed over the open ends of the resilient member, supports the open ends to keep the pressure uniform. The supporting member also helps ease the installation of the retaining clip onto the barrel nut.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. An apparatus for retaining a barrel nut within a cylindrical bore in a panel comprising:
   a barrel nut comprised of a threaded bore having a longitudinal axis, and a generally cylindrical base portion having opposed first and second shoulders on the outer extremity thereof, and further having opposed first and second end surfaces at the outer extremity thereof, said shoulders projecting away from the threaded bore; and
   retaining means comprised of: a resilient member having a first portion and a second portion being positioned on opposite sides of the threaded bore and being seated on said opposed shoulders in a plain generally perpendicular to the longitudinal axis, a part of said first portion and of said second portion being adapted to engage the panel when the apparatus is installed within said cylindrical bore, and a third portion disposed between said first and second portions and integrally connecting said first and second portions, said third portion being engaged with said first end surface in a plane generally parallel to the longitudinal axis; and a supporting member connecting said first and second portions, said supporting member being engaged with said second end surface in a plane generally parallel to the longitudinal axis;

wherein said first portion and said second portion are both curved and convex in relation to the longitudinal axis.

2. An apparatus for retaining a barrel nut within a cylindrical bore in a panel comprising:

a barrel nut comprised of a threaded bore having a longitudinal axis, and a partially cylindrical base portion having opposed first and second shoulders on the outer extremity thereof, and further having opposed first and second end surfaces at the outer extremity thereof, said shoulders projecting away from the threaded bore; and retaining means comprised of: a resilient member having a first portion and a second portion being positioned on opposite sides of the threaded bore and being seated on said opposed shoulders in a plain generally perpendicular to the longitudinal axis, a part of said first portion and of said second portion being adapted to engage the panel when the apparatus is installed within said cylindrical bore, and a third portion disposed between said first and second portions and integrally connecting said first and second portions, said third portion being engaged with said first end surface in a plane generally parallel to the longitudinal axis; and a supporting member connecting said first and second portions, said supporting member being engaged with said second end surface in a plane generally parallel to the longitudinal axis;

wherein said first portion and said second portion are each comprised of two straight segments joined together so that the juncture of said segments engages the panel when the apparatus is installed within said cylindrical bore.

3. An apparatus for retaining a barrel nut within a cylindrical bore in a panel so that the barrel nut is capable of threadedly receiving a bolt extending through a bolt hole in the panel, the bolt hole being oriented transversely to the cylindrical bore, the apparatus comprising:

a barrel nut comprised of a threaded bore having a longitudinal axis, and a partially cylindrical base portion sized to fit into the cylindrical bore in the panel and having opposed first and second shoulders on the outer extremity thereof, and further having opposed first and second end surfaces at the outer extremity thereof, said shoulders projecting away from the threaded bore; and a retaining clip adapted to be positioned within the cylindrical bore in the panel, said retaining clip comprised of: a resilient member having a first portion and a second portion being positioned on opposite sides of the threaded bore and being seated on said opposed shoulders in a plane generally perpendicular to the longitudinal axis, said first portion and said second portion being both curved and convex in relation to the longitudinal axis, a part of said first portion and of said second portion being adapted to frictionally engage the panel when the apparatus is installed within said cylindrical bore, and a third portion disposed between said first and second portions and integrally connecting said first and second portions, said third portion being frictionally engaged with said first end surface in a plane generally parallel to the longitudinal axis; and a supporting member connecting said first and second portions, said supporting member being frictionally engaged with said second end surface in a plane generally parallel to the longitudinal axis;

wherein said first portion and said second portion both have cylindrical ends adjacent to said second end surface in a plane generally parallel to the longitudinal axis, and said supporting member is a hollow cylindrical tube having said ends inserted in opposite extremities thereof.

4. An apparatus for retaining a barrel nut within a cylindrical bore in a panel so that the barrel nut is capable of threadedly receiving a bolt extending through a bolt hole in the panel, the bolt hole being oriented transversely to the cylindrical bore, the apparatus comprising:

a barrel nut comprised of a threaded bore having a longitudinal axis, and a partially cylindrical base portion sized to fit into the cylindrical bore in the panel and having opposed first and second shoulders on the outer extremity thereof, and further having opposed first and second end surfaces at the outer extremity thereof, said shoulders projecting away from the threaded bore; and a retaining clip adapted to be positioned within the cylindrical bore in the panel, said retaining clip comprised of: a resilient member having a first portion and a second portion being positioned on opposite sides of the threaded bore and being seated on said opposed shoulders in a plane generally perpendicular to the longitudinal axis, said first portion and said second portion being each comprised of two straight segments joined together so that the juncture of said segments frictionally engages the panel when the apparatus is installed within the cylindrical bore, and a third portion disposed between said first and second portions and integrally connecting said first and second portions, said third portion being frictionally engaged with said first end surface in a plane generally parallel to the longitudinal axis; and a supporting member connecting said first and second portions, said supporting member being frictionally engaged with said second end surface in a plane generally parallel to the longitudinal axis;

wherein said first portion and said second portion both have cylindrical ends adjacent to said second end surface in a plane generally parallel to the longitudinal axis, and said supporting member is a hollow cylindrical tube having said ends inserted in opposite extremities thereof.

* * * * *